(12) United States Patent
Takaki et al.

(10) Patent No.: US 10,839,232 B2
(45) Date of Patent: Nov. 17, 2020

(54) VEHICLE CONTROL METHOD AND APPARATUS

(71) Applicant: DENSO CORPORATION, Kariya, Aichi-pref. (JP)

(72) Inventors: Ryo Takaki, Kariya (JP); Yosuke Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 15/882,878

(22) Filed: Jan. 29, 2018

(65) Prior Publication Data
US 2018/0218227 A1 Aug. 2, 2018

(30) Foreign Application Priority Data
Jan. 30, 2017 (JP) .................. 2017-014332

(51) Int. Cl.
G06K 9/00 (2006.01)
G06K 9/32 (2006.01)
B60W 30/09 (2012.01)
B60W 30/095 (2012.01)
G08G 1/16 (2006.01)
H04N 5/14 (2006.01)

(52) U.S. Cl.
CPC ......... G06K 9/00805 (2013.01); B60W 30/09 (2013.01); B60W 30/0956 (2013.01); G06K 9/3241 (2013.01); G06T 2207/30236 (2013.01); G08G 1/166 (2013.01); H04N 5/147 (2013.01)

(58) Field of Classification Search
CPC ............... G08G 1/166; G06K 9/00805; G06T 2207/30236; H04N 5/147
See application file for complete search history.

(56) References Cited

U.S. PATENT DOCUMENTS

| 2014/0152488 | A1 | 6/2014 | Baba |
| 2014/0324330 | A1 | 10/2014 | Minemura et al. |
| 2015/0334269 | A1* | 11/2015 | Yokota ................... H04N 5/232 382/103 |
| 2017/0003390 | A1 | 1/2017 | Baba |
| 2018/0079408 | A1 | 3/2018 | Takahashi et al. |

* cited by examiner

Primary Examiner — Ross Varndell
(74) Attorney, Agent, or Firm — Maschoff Brennan

(57) ABSTRACT

In an apparatus, an attention region defining unit defines an attention region near a blocking obstacle upon the blocking object being determined to be located between the own vehicle and the target object based on the results of the detection operations. The blocking object at least partly blocks a view from the own vehicle. A determiner determines whether the target object is located in the attention region. An obtaining unit obtains, upon it being determined that the target object is located in the attention region, a detection history of the target object by the object detection sensor before the target object is determined to be located in the attention region. An adjuster adjusts, based on the obtained detection history, a predetermined procedure of recognition for the target object upon it being determined that the target object is located in the attention region.

12 Claims, 6 Drawing Sheets

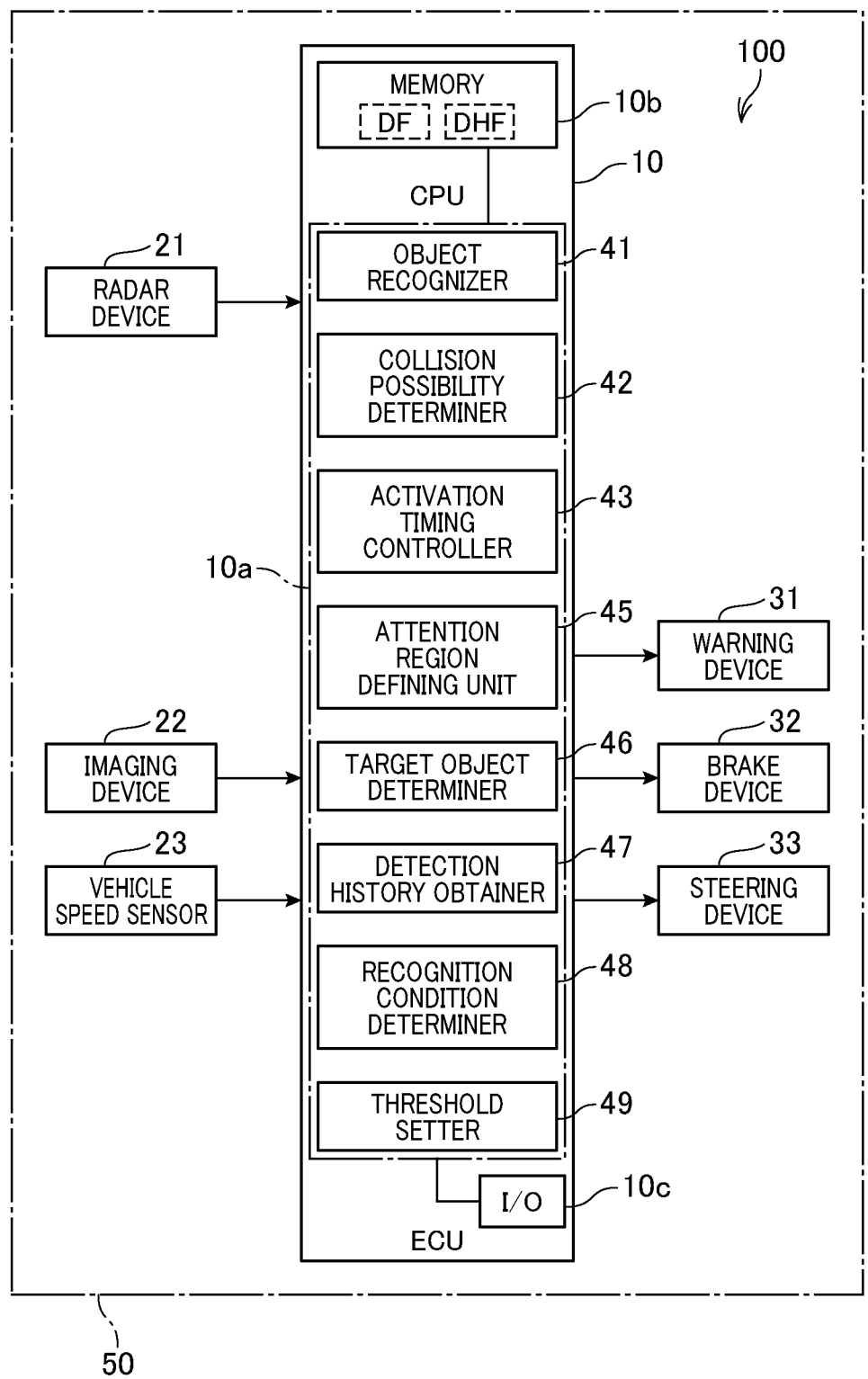

VEHICLE CONTROL METHOD AND APPARATUS

CROSS REFERENCE TO RELATED APPLICATION

This application is based on and claims the benefit of priority from Japanese Patent Application No. 2017-014332 filed on Jan. 30, 2017, the disclosure of which is incorporated in its entirety herein by reference.

TECHNICAL FIELD

The present invention relates to methods and apparatuses for performing a collision safety control task to thereby activate a safety device installed in an own vehicle.

BACKGROUND

Conventionally, vehicle control apparatuses perform a known pre-crash safety (PCS) control task as an example of a collision safety control task. The PCS control task activates at least one safety device installed in an own vehicle to thereby mitigate and/or avoid collision damage between the own vehicle and objects, such as other vehicles, pedestrians, or road structures located ahead in the travelling direction of the own vehicle.

For example, Japanese Patent Application Publication No. 2014-109943, which will be referred to as a published patent document, discloses an example of a vehicle control apparatus configured to perform such a PCS control task.

The vehicle control apparatus disclosed in the published patent document is configured to address a target object, such as a pedestrian, which suddenly runs in front of an own vehicle from a region at least partly blocked by a stopped vehicle when viewed from the own vehicle.

Specifically, the vehicle control apparatus disclosed in the published patent document has an object recognition condition, such as a pedestrian recognition condition, and performs an object recognition task to thereby determine that there is a target object, such as a pedestrian, in front of the own vehicle upon the target object satisfying the predetermined object recognition condition.

In particular, the vehicle control apparatus disclosed in the published patent document relaxes a level of the predetermined object recognition condition for a region at least partly blocked by a blocking obstacle, such as a stopped vehicle, located in front of the own vehicle to be lower than a level of the predetermined object recognition condition for the same region in the case where there are no blocking obstacles, such as stopped vehicles, detected in front of the own vehicle.

For example, the vehicle control apparatus disclosed in the published patent document performs the object recognition tasks based on respective captured images in front of the own vehicle. The vehicle control apparatus determines whether the number of at least one of pedestrian image patterns being recognized in the captured images during the object recognition tasks has reached a predetermined number. Then, the vehicle control apparatus determines that there is a pedestrian in front of the own vehicle when determining that the predetermined pedestrian recognition condition is satisfied upon the number of at least one of pedestrian image patterns being recognized in the captured images during the image recognition tasks having reached the predetermined threshold number.

In particular, the vehicle control apparatus reduces the threshold number to thereby relax the predetermined pedestrian recognition condition for the region at least partly blocked by the stopped vehicle located in front of the own vehicle if the stopped vehicle is detected in front of the own vehicle.

This condition relaxation enables a pedestrian located in the region at least partly blocked by the stopped vehicle to be recognized faster.

SUMMARY

The vehicle control apparatus disclosed in the published patent document relaxes the level of the predetermined object recognition condition for a region at least partly blocked by a blocking obstacle, such as a stopped vehicle, located in front of the own vehicle without exception.

For this reason, if a target object, which has been already captured by the vehicle control apparatus, moves into the region at least partly blocked by the blocking obstacle, the vehicle control apparatus disclosed in the published patent document relaxes the level of the predetermined object recognition condition for the blocked region. This may result in the target object, which is located in the blocked region, being recognized faster, although it is unnecessary to recognize the target object faster. This is because it is possible to predict an accurate movement trajectory of the target object that has been already detected by the vehicle control apparatus.

Unnecessary faster recognition of the target object, which has been already captured by the vehicle control apparatus, may result in unnecessary activation of at least one safety device installed in the own vehicle.

In view of these circumstances, the present disclosure mainly seeks to provide methods and apparatuses for controlling a vehicle, each of which is capable of properly activating at least one safety device if there is a blocking obstacle located ahead in a travelling direction of the vehicle.

A first exemplary aspect of the present disclosure is an apparatus to be installed in an own vehicle equipped with an object detection sensor that repeatedly performs a detection operation for detecting objects around the own vehicle. The apparatus is configured to recognize, based on results of the detection operations, a target object in accordance with a predetermined procedure, and perform at least one of a collision avoidance operation and a damage mitigation operation for the own vehicle with respect to the recognized target object. The apparatus includes an attention region defining unit configured to define an attention region near a blocking obstacle upon the blocking object being determined to be located between the own vehicle and the target object based on the results of the detection operations. The blocking object at least partly blocks a view from the own vehicle. The apparatus includes a determiner configured to determine whether the target object is located in the attention region, and an obtaining unit configured to obtain, upon it being determined that the target object is located in the attention region, a detection history of the target object by the object detection sensor before the target object is determined to be located in the attention region. The apparatus includes an adjuster configured to adjust, based on the obtained detection history, the predetermined procedure of recognition for the target object upon it being determined that the target object is located in the attention region.

A second exemplary aspect of the present disclosure is a method applied to an apparatus to be installed in an own vehicle equipped with an object detection sensor that repeatedly performs a detection operation for detecting objects around the own vehicle. The method recognizes, based on results of the detection operations, a target object in accordance with a predetermined procedure, and perform at least one of a collision avoidance operation and a damage mitigation operation for the own vehicle with respect to the recognized target object. The method includes defining an attention region near a blocking obstacle upon the blocking object being determined to be located between the own vehicle and the target object based on the results of the detection operations, and determining whether the target object is located in the attention region. The method includes obtaining, upon it being determined that the target object is located in the attention region, a detection history of the target object by the object detection sensor before the target object is determined to be located in the attention region. The method includes adjusting, based on the obtained detection history, the predetermined procedure of recognition for the target object upon it being determined that the target object is located in the attention region.

If there is a blocking obstacle located between the own vehicle and a target object, and the blocking obstacle blocks the view from the own vehicle, it may be difficult for the apparatus or method to recognize the target object. For example, if the target object is located in the attention region defined near the blocking obstacle, it is desired to immediately recognize the target object in view of reduction of deactivation of at least one safety device, and also to reliably recognize the target object in view of reduction of unnecessary activation of the at least one safety device.

In addition, urgency of recognition for the target object that is located in the attention region is changed depending on the detection history of the target object before the target object is located in the attention region.

From this viewpoint, each of the apparatus and method is adapted to determine whether the target object is located in the attention region, and upon determining that the target object is located in the attention region, each of the apparatus and method is adapted to obtain the detection history of the target object before determining that the target object is located in the attention region. Then, each of the apparatus and method is adapted to adjust the procedure for recognizing the target object as a function of the obtained detection history.

Specifically, upon it being determined that the target object has not been captured before determining that the target object is located in the attention region, the urgency of recognition for the target object is high, so that it is necessary to cause the urgency of recognition for the target object to have a higher priority than the reliability of recognition for the target object.

Otherwise, upon it being determined that the target object has been captured before determining that the target object is located in the attention region, the urgency of recognition for the target object is relatively low, so that it is necessary to cause the reliability of recognition for the target object to have a higher priority than the urgency of recognition for the target object.

For this reason, the above configuration of each of the apparatus and method makes it possible to perform the object recognition task for the target object while factoring in the urgency of recognition for the target object. This enables the at least one safety device to be suitably activated to satisfy both the urgency and the reliability of recognition for the target object even if the target object is located in the attention region.

BRIEF DESCRIPTION OF THE DRAWINGS

Other aspects of the present disclosure will become apparent from the following description of embodiments with reference to the accompanying drawings in which:

FIG. 1 is a block diagram schematically illustrating an example of the structure of a pre-crash safety system according to an exemplary embodiment of the present disclosure;

DETAILED DESCRIPTION OF EMBODIMENT

Figure 2A:
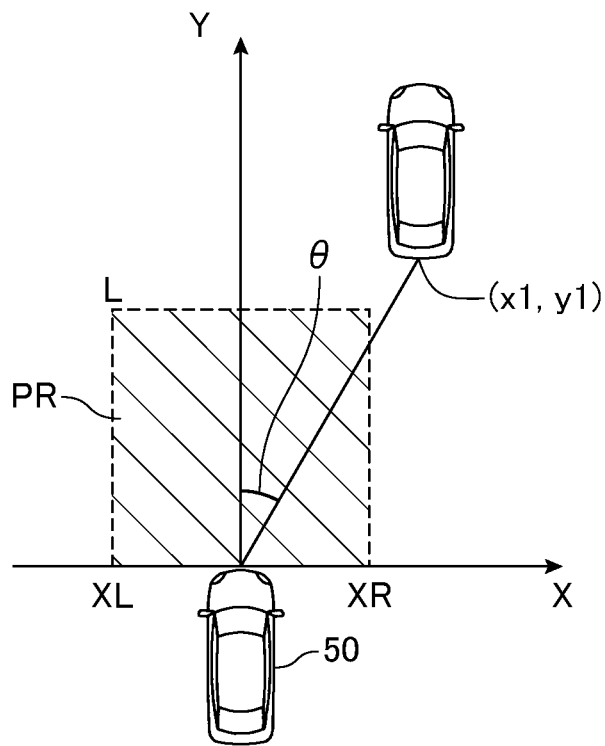
FIG. 2A is a view schematically illustrating an example of first detection information about a radar-based object according to the exemplary embodiment.

The following describes an exemplary embodiment of the present disclosure with reference to the accompanying drawings.

FIG. 1 schematically illustrates a pre-crash safety (PCS) system 100 based on a vehicle control apparatus according to the first embodiment installed in an own vehicle 50. The PCS system 100 is capable of 1. Recognizing an object located around the own vehicle 50, such as ahead of the own vehicle 50 in the travelling direction of the own vehicle 50, i.e. in the forward direction of the own vehicle 50

2. Performing control tasks of the own vehicle 50 including a collision avoidance operation to avoid collision between the recognized object and the own vehicle 50 and/or a damage mitigation operation to mitigate damage due to collision therebetween Referring to FIG. 1, the PCS system 100 includes an electronic control unit (ECU) 10, a radar device 21, an imaging device 22, which are an example of object detection sensors, a vehicle speed sensor 23, a warning device 31, a brake device 32, and a steering device 33. In FIG. 1, the radar device 21 and the imaging device 22 constitute object detecting sensors, and at least the ECU 10 serves as a vehicle control apparatus. The warning device 31, brake device 32, and steering device 33 serve as safety devices.

The sensors 21 to 23 are connected to the ECU 10 and are operative to input various pieces of detected information to the ECU 10.

For example, the radar device 21 is designed to detect objects located in front of the own vehicle 50 using, for example, directional electromagnetic waves, i.e. probe waves, such as millimeter waves or radar waves. The radar device 21 is mounted at, for example, the center of the front end of the own vehicle 50 such that its optical axis of the probe waves is directed toward the forward direction of the own vehicle 50.

The radar device 21 has a predetermined detection range that has a predetermined view angle, such as a detection angle, or scanning angle, and extends in the right and left direction around the optical axis. That is, the radar device 21 is capable of detecting the position of an object within the detection range.

Specifically, the radar device 21 performs, in a first period, an object information obtaining task to 1. Transmit probe waves to the detection range through a transmitting antenna 2. Receive reflected waves, i.e. echoes, based on reflection of the transmitted radar waves by the outer surface of an object through respective receiving antennas 3. Calculate the relative position of the object relative to the own vehicle 50 based on the transmission time of the prove waves and the reception times of the respective reflected waves 4. Calculate the azimuth of the object based on the differences in phase between the reflection waves received by the respective receiving antennas 5. Calculate the relative speed between the own vehicle 50 and the object based on the frequencies of the reflected waves; the frequencies have been changed based on the Doppler effect.

That is, the radar device 21 obtains, in the first period, first detection information including the relative position, azimuth, and the relative speed of the object. Note that objects detected by the radar device 21 will be referred to as radar-based objects.

As illustrated in FIG. 2A, each of the radar device 21 and the ECU 10 has a coordinate system defined by an X axis and a Y axis; the X axis extends in the width direction, i.e. lateral direction, of the own vehicle 50 while passing through the center, i.e. an origin, of the front end of the own vehicle 50. The Y axis extends from the center of the front end of the own vehicle 50 in the travelling direction of the own vehicle 50.

The coordinates of the relative position of a radar-based object have a lateral position in the X axis and a longitudinal position in the Y axis.

That is, as illustrated in FIG. 2A, if a radar-based object is a preceding vehicle PV in front of the own vehicle 50, the radar device 21 obtains the first detection information about the radar-based object PV including 1. The relative position (x1, y1) of, for example, the rear end of the radar-based object PV in the XY coordinate system 2. The azimuth θ of the relative position (x1, y1) of the radar-based object PV relative to the own vehicle 50 in the XY coordinate system 3. The relative speed between the own vehicle 50 and the radar-based object PV The radar device 21 also outputs, to the ECU 10, the obtained first detection information about the radar-based object in the first period.

The imaging device 22 is designed as a camera device, such as a CCD camera device, a CMOS image sensor device, or a near-infrared camera device. For example, the imaging device 22 is mounted to the center of a predetermined portion, such as the upper end of the front windshield, of the own vehicle 50 in the vehicle width direction at a predetermined height. The imaging device 22 has an optical axis extending in front of the own vehicle 50. The imaging device 22 has a region, i.e. an imaging range, that horizontally extends around the optical axis within a predetermined angular range, i.e. a predetermined angle of view. The imaging device 22 captures, from the predetermined height, i.e. from a higher point of view, images of the region, i.e. the imaging range in the second period, and sends, to the ECU 10, the captured images in the second period. Note that a monocular camera device or a stereo camera device can be used as the imaging device 22.

The vehicle speed sensor 23 is mounted to the rotary shaft of the own vehicle 50, which transfers torque to the driving wheels of the own vehicle 50, and is operative to obtain the speed of the own vehicle 50 as vehicle speed V based on the number of turns of the driving wheels.

The warning device 31 includes a speaker and/or a display mounted in the compartment of the own vehicle 50. The warning device 31 is configured to output warnings including, for example, warning sounds and/or warning messages to inform the driver of the presence of an object in response to a control instruction sent from the ECU 10.

The brake device 32 is configured to brake the own vehicle 50. The brake device 32 is activated in response to a control instruction sent from the ECU 10 when the ECU 10 determines that there is a high possibility of collision of the own vehicle 50 with an object. Specifically, the brake device 32 performs a brake-assist function of increasing braking force, which is based on the driver's brake operation, to the own vehicle 50, or an automatic brake function of automatically braking the own vehicle 50 if there is no braking operation by the driver.

The steering device 33 is configured to control the travelling course of the own vehicle 50. The steering device 33 is activated in response to a control instruction sent from the ECU 10 when the ECU 10 determines that there is a high possibility of collision of the own vehicle 50 with an object. Specifically, the steering device 33 performs a steering assist function of assisting a driver's steering operation of the steering wheel of the own vehicle 50, or an automatic steering function of automatically steering the own vehicle 50 if there is no steering operation by the driver.

The ECU 10 is designed as, for example, a microcomputer including a CPU 10a, a memory 10b comprised of at least a ROM, a RAM, and/or a semiconductor memory such as a flash memory. The ECU 10 includes an I/O device (I/O) 10c connected via input ports to the radar device 21, the imaging device 22, and the vehicle speed sensor 23 and connected via output ports to the warning device 31, the brake device 32, and the steering device 33. The various functions of the PCS system 100 are implemented by the CPU 10a in executing programs that are stored in non-transitory recording media. For example, the memory 10b serves as the non-transitory recording media in which the programs are stored. Furthermore, the CPU 10a executes the programs, thus executing methods corresponding to the programs. The PCS system 100 is not necessarily configured with a single microcomputer, and it would be equally possible to have a plurality of microcomputers.

In particular, the ECU 10 is configured to perform a PCS control task that

1. Recognizes at least one object in accordance with the first detection information input from the radar device 21 and the second detection information input from the imaging device 22

2. Controls at least one of the warning device 31, the brake device 32, and the steering device 33 for each of the recognized at least one object The ECU 10 functionally includes, for example, an object recognizer 41, a collision possibility determiner 42 and an activation timing controller 43 for implementing the PCS control task.

The object recognizer 41 periodically obtains the first detection information from the radar device 21, and periodically obtains the captured image from the imaging device 22, and stores each of the captured images in the memory 10b.

The object recognizer 41 recognizes at least one radar-based object in accordance with the first detection information.

The object recognizer 41 uses object model dictionary files DF that have been stored beforehand in the memory 10b. The object model dictionary files DF are provided for respective types of object, such as vehicles, pedestrians, bicycles, on-road obstacles, etc. In particular, each of the dictionary files DF includes object models, i.e. feature quantity templates, i.e. feature quantity patterns, provided for the corresponding object type.

For example, the dictionary file DF for vehicles includes front-end feature patterns for each of various vehicle models including large-sized models, standard-sized models, and mini-sized models, and rear-end feature patterns for each of the various vehicle models.

In addition, the dictionary file DF for pedestrians includes, for example, upper-body feature patterns, lower-body feature patterns, and whole-body feature patterns.

The object recognizer 41 performs pattern matching of the captured image stored in the memory 10b with each of the feature patterns included in all the dictionary files DF to thereby detect at least one object and its type, such as a vehicle, a pedestrian, a cyclist, an on-road obstacle, etc in the captured image as an image-based object.

In particular, the object recognizer 41 obtains second detection information about the at least one image-based object as follows.

Figure 2B:
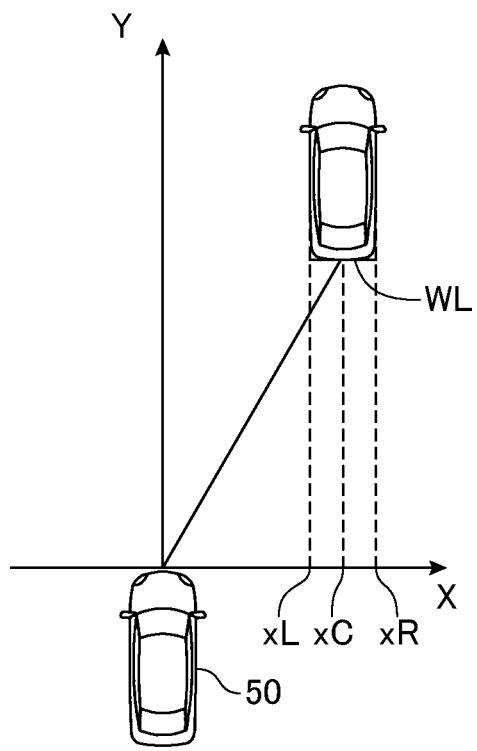
FIG. 2B is a view schematically illustrating an example of second detection information about an image-based object according to the exemplary embodiment.

For example, as illustrated in FIG. 2B, if an image-based object is a preceding vehicle PV1 in front of the own vehicle 50, the object recognizer 41 obtains the second detection information about the image-based object PV1 including 1. The left and light edge positions xL, xR of, for example, the rear end of the image-based object PV1 in the X axis of the XY coordinate system to thereby obtain the center position xC of, for example, the rear end of the image-based object PV1 in the XY coordinate system 2. The lateral width WL of the image-based object PV1 in the XY coordinate system The object recognizer 41 obtains first position information about each radar-based object based on the relative position of the corresponding radar-based object, and second position information about each image-based object based on the feature points corresponding to the image-based object.

Then, the object recognizer 41 determines that a radar-based object and an image-based object are the same object when the corresponding first position information is close to the corresponding second position information. Next, the object recognizer 41 matches the corresponding first detection information with the corresponding second detection information, thus generating fusion information.

Specifically, if the second position information about an image-based object is located to be close to the first position information about a radar-based object, there is a high possibility of a corresponding actual object being located at the position based on the first position information. The state where the first position information about each radar-based object is identical to or close to the second position information about the corresponding image-based object will be referred to as a fusion state, and an object detected in the fusion state will be referred to as a fusion-based object. In other words, the fusion state shows that the radar device 21 and the imaging device 22 have each obtained the position of an object with high accuracy.

For example, the fusion information about a fusion-based object includes

1. The relative position of the fusion-based object relative to the own vehicle 50 for example based on the first detection information 2. The azimuth of the relative position of the fusion-based object relative to the own vehicle 50 for example based on the first detection information 3 The relative speed between the own vehicle 50 and the fusion-based object for example based on the first detection information 4. The lateral width of the fusion-based object for example based on the second detection information The object recognizer 41 performs, in a predetermined recognition period, an object recognizing task that includes 1. Obtaining the first detection information about each radar-based object 2. Obtaining the second detection information about each image-based object 3. Obtaining the fusion information about each fusion-based object detected in the fusion state The object recognizer 41 recognizes that one or more actual objects are located around the own vehicle 50 based on the corresponding one or more fusion-based objects detected thereby during a predetermined number of periods.

Specifically, the object recognizer 41 recognizes that an actual object is located at the relative position of a corresponding fusion-based object after having continuously recognized the same fusion-based object at least a predetermined threshold number of times A. The threshold number of times A is determined such that, if the same fusion-based object has continuously been recognized at least the threshold number of times A, it is determined that an actual object corresponding to the fusion-based object is likely to be located at the relative position of the fusion-based object. The threshold number of times A in a normal recognition mode is set to, for example, three times.

That is, the threshold number of times A serves as a recognition condition according to the exemplary embodiment.

The object recognizer 41 stores, for each recognition period, the first detection information about each radar-based object, the second detection information about each image-based object, and the fusion information about each fusion-based object into the memory 10b as a detection history file DHF.

In particular, the object recognizer 41 stores, as the detection history file DHF, a cumulative detection number N, whose initial value is set to zero, prepared for an object detected as any one of the radar-based object, the image-based object, and the fusion-based object.

That is, the object recognizer 41 increments the cumulative detection number N prepared for an object by 1 each time the same object is detected as any one of the radar-based object, the image-based object, and the fusion-based object. That is, the object recognizer 41 increments the cumulative detection number N prepared for an object by 1 from the initial value of zero upon the object is detected for the first time as any one of the radar-based object, the image-based object, and the fusion-based object.

The collision possibility determiner 42 has a predetermined collision prediction region PR previously defined for the own vehicle 50 in the XY coordinate system. The collision prediction region PR serves as a criterion in performing a collision avoidance task.

For example, the collision prediction region PR

1. Has the center axis corresponding to the Y axis illustrated in FIG. 2A

2. Has a rightward width based on a rightward limit XR in the rightward direction relative to the travelling direction 3. Has a leftward width based on a leftward limit XL in the rightward direction relative to the travelling direction 5. Has a predetermined length, i.e. depth, L from the center of the front end of the own vehicle 50 along the Y axis direction Upon recognizing an object, such as a fusion-based object, the collision possibility determiner 43 determines whether there is a possibility of collision of the own vehicle 50 with the fusion-based object using the collision prediction region PR.

Specifically, the collision possibility determiner 42 determines whether the lateral position of the recognized fusion-based object is located within the collision prediction region PR, and determines that there is a possibility of collision of the own vehicle 50 with the recognized fusion-based object upon determining that the lateral position of the recognized fusion-based object is located within the collision prediction region PR.

The activation timing controller 43 calculates a time to collision (ITC), which represents a margin time until which the own vehicle 50 would collide with the recognized fusion-based object in accordance with the relative position of the recognized fusion-based object and the relative speed between the own vehicle 50 and the recognized fusion-based object upon determining that there is a possibility of collision of the own vehicle 50 with the recognized fusion-based object.

Then, the activation timing controller 43 compares the calculated TTC with the activation timings of the respective safety devices, i.e. the thresholds representing the respective activation timings.

Specifically, the thresholds are respectively set for the warning device 31, the brake device 32, and the steering device 33. The relative sizes among the thresholds are identical to the above relative sizes among the activation timings.

The thresholds respectively set for the warning device 31, the brake device 32, and the steering device 33 are for example determined such that the threshold for the warning device 31 is larger than the threshold for the brake device 32, and the threshold for the steering device 33 is larger than the threshold for the brake device 32.

If the own vehicle 50 approaches the recognized fusion-based object, so that the TTC becomes lower than the threshold for the activation timing for the warning device 31, the activation timing controller 43 determines that it is time to activate the warning device 31, thus transmitting an activation control signal to the warning device 31. This causes the warning device 31 to be activated to output warnings, thus informing the driver of a risk of collision with the fusion-based object.

After activation of the warning device 31, if the own vehicle 50 further approaches the fusion-based object with the brake pedal being not depressed by the driver, so that the ITC further decreases to become lower than the threshold for the activation timing for the automatic brake function of the brake device 32, the activation timing controller 43 determines that it is time to activate the automatic brake function of the brake device 32, thus transmitting an activation control signal to the automatic brake function of the brake device 32. This causes the brake device 32 to be activated to perform braking control of the own vehicle 50.

On the other hand, after activation of the warning device 31, if the own vehicle 50 further approaches the fusion-based object despite the driver's depression of the brake pedal, so that the ITC further decreases to become lower than the threshold for the activation timing for the brake-assist function of the brake device 32, the activation timing controller 43 determines that it is time to activate the brake-assist function of the brake device 32, thus transmitting an activation control signal to the brake-assist function of the brake device 32. This causes the brake device 32 to be activated to increase braking force based on the driver's depression of the braking pedal.

After activation of the brake device 32, if the own vehicle 50 further approaches the fusion-based object, so that the TTC further decreases to become lower than the threshold for the activation timing for the steering device 33, the activation timing controller 43 determines that it is time to activate the steering device 33, thus transmitting an activation control signal to the steering device 33. This causes the steering device 33 to be activated to perform forcible steering control of the own vehicle 50.

Note that the activation timing controller 43 can be configured to

1. Compare the actual relative distance calculated based on the TTC with predetermined thresholds for the activation timings of the respective safety devices 2. Determine whether to activate each of the safety devices in accordance with the results of the comparison.

The above PCS control task implemented by the functional modules 41 to 43 aims to mitigate or avoid collision damage between the own vehicle 50 and a recognized object, such as the fusion-based object.

If there is a blocking obstacle located between the own vehicle 50 and an object, and the blocking obstacle blocks the view from the own vehicle 50 toward the object, it may be difficult for the PCS system 100 to recognize the object.

FIG. 3A illustrates a situation where there is a stopped vehicle 60 as a blocking obstacle between the own vehicle 50 and a pedestrian 70 as an object to be recognized. That is, in this situation, the PCS system 100 installed in the own vehicle 50 aims to recognize the pedestrian 70, and performs the PCS control task for the recognized pedestrian 70.

The ECU 10 of the PCS system 100 according to the exemplary embodiment is configured to, if the stopped vehicle 60 is recognized by the radar device 21 and the imaging device 22, define an attention region S (see FIG. 3) near the stopped vehicle 60 in the XY coordinate system; the attention region S includes a hidden region that is hidden by the stopped vehicle 60 with respect to the own vehicle 50.

Figure 3:
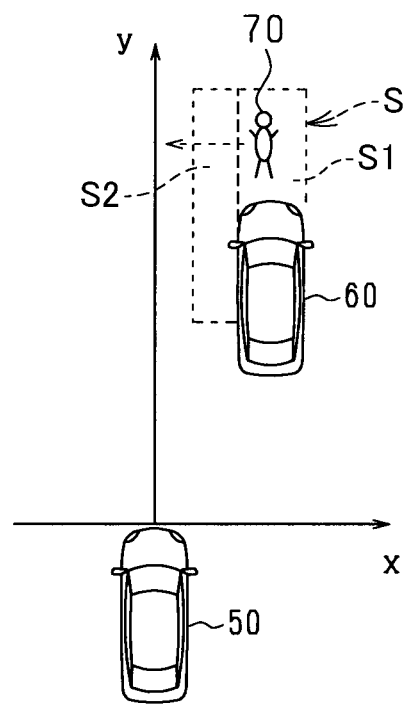
FIG. 3 is a view schematically illustrating an example of a blocking obstacle, an attention region defined near the blocking obstacle, and a pedestrian according to the exemplary embodiment.

For example, as illustrated in FIG. 3, the attention region S, which has a predetermined shape, includes a first region S1 and a second region S2 in the XY coordinate system. The first region S1 is blocked by the stopped vehicle 60 when viewed from the own vehicle 50, that is, is located ahead of the stopped vehicle 60 when viewed from the own vehicle 50. The second region S2 is located to be adjacent to the closer side of the stopped vehicle 60 to the own vehicle 50.

Let us consider a situation where the pedestrian 70 lies in the attention region S and suddenly runs in front of the own vehicle 50. In this situation, it is desired to activate the safety devices 31 to 33 earlier.

From this viewpoint, the conventional vehicle control apparatus set forth above relaxes a level of a predetermined object recognition condition for the attention region S upon the stopped vehicle 60 being detected to be lower than the level of the predetermined object recognition condition for the same region S upon no blocking obstacles being detected. For example, the conventional vehicle control apparatus sets the threshold number of times A for the attention region S upon the stopped vehicle 60 being detected to be lower than the threshold number of times A for the same region S upon no blocking obstacles being detected.

This enables the vehicle control apparatus to recognize the pedestrian 70 located in the attention region S faster, making it possible to activate the safety devices earlier even if the pedestrian 70 suddenly runs in front of the own vehicle 50.

The conventional vehicle control apparatus relaxes the level of the predetermined object recognition condition for the attention region S without exception. This may result in a target object located in the attention region S, for which faster recognition is not necessarily required, being recognized faster. This may result in unnecessary activation of the safety devices 31 to 33.

Figure 4:
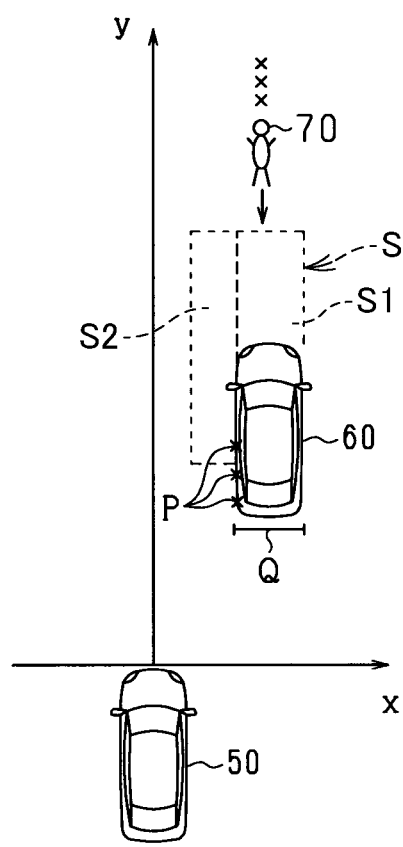
FIG. 4 is a view schematically illustrating an example of the positional relationship between the attention region and a pedestrian.

For example, FIG. 4 schematically illustrates a case where a pedestrian 70, who is located ahead in the travelling direction of the own vehicle 50 is moving toward the attention region S; the pedestrian 70 has been continuously recognized by the object detection sensors 21 and 22. In this case, even if the pedestrian 70 has entered the attention region S, it is possible for the PCS system 100 to predict an accurate movement trajectory of the pedestrian 70, because the pedestrian 70 has been already detected by the PCS system 100. For this reason, in this case, it is unnecessary to recognize the pedestrian 70 faster. In other words, unnecessary faster recognition of the pedestrian 70, which has been already detected by the object detection devices 21 and 22, may result in unnecessary activation of the safety devices 31 to 33.

From this viewpoint, the ECU 10 of the PCS system 100 according to the exemplary embodiment is configured to 1. Determine whether a target object is located in the attention region S defined around a blocking obstacle 2. Obtain, upon determining that the target object is located in the attention region S, the past detection situation, i.e. the detection history, of the target object 3. Adjust a procedure for recognizing the target object as a function of the obtained detection history Specifically, the ECU 10 of the PCS system 100 is configured to (1) Relax the recognition condition for the target object upon determining that the target object has not been captured before determination that the target object is located in the attention region S (2) Maintain the recognition condition for the target object unchanged upon determining that the target object has been captured before determination that the target object is located in the attention region S That is, the ECU 10 is configured to (1) Perform the object recognition task in a condition relaxation mode using a relaxed recognition condition, such as a threshold number B of times lower than the threshold number of times A upon determining that the target object has not been captured before determination that the target object is located in the attention region S (2) Perform the object recognition task in the normal recognition mode using the recognition condition, such as the threshold number of times A Specifically, the conventional vehicle control apparatus makes recognition of a target object faster without exception upon determining that the target object is located in the attention region S while immediate recognition has a higher priority than reliable recognition.

In contrast, the ECU 10 according to the exemplary embodiment is specifically configured to perform a recognition condition adjustment task that (1) Determines whether it is necessary to immediately recognize a target object (2) Makes recognition of the target object faster upon determining that it is necessary to immediately recognize the target object (3) Disables immediate recognition of the target object upon determining that it is unnecessary to immediately recognize the target object The ECU 10 according to the exemplary embodiment functionally includes an attention region defining unit 45, a target object determiner 46, a detection history obtainer 47, a recognition condition determiner 48, and a threshold setter 49 that implement the specific configuration, i.e. the recognition condition adjustment task.

The attention region defining unit 45 is configured to define an attention region S when the object recognizer 41 detects a blocking obstacle 60, for example, a stopped vehicle 60 in the exemplary embodiment, in accordance with the first detection information periodically obtained from the radar device 21 and the second detection information periodically obtained from the imaging device 22.

Specifically, as illustrated in FIG. 4, if there is a stopped vehicle located ahead in the travelling direction of the own vehicle 50 is travelling, the object recognizer 41 detects a preceding vehicle based on the result of the pattern matching of the captured image stored in the memory 10b with the rear-end feature patterns Q included in the dictionary files DF. Note that the object recognizer 41 can recognize the preceding vehicle based on the result of the pattern matching of the captured image stored in the memory 10b with the front-end feature patterns included in the dictionary files DF.

Additionally, the radar device 21 detects plural detection points P, i.e. radar reflection points P, of the preceding vehicle located in parallel to the travelling direction of the own vehicle 50 while the location of the set of the plural detection points P is unchanged. At that time, the object recognizer 41 detects a closer side of the preceding vehicle ahead in the travelling direction of the own vehicle 50 in accordance with the first detection information based on the plural detection points P.

This enables the attention region defining unit 45 to detect the preceding vehicle 60 as a stopped vehicle 60 ahead in the travelling direction of the own vehicle 50. Note that the object recognizer 41 can detect the stopped vehicle 60 based on the relative speed between the own vehicle 50 and the stopped vehicle 60.

Then, the attention region defining unit 45 define the attention region S (see FIG. 3) around the stopped vehicle 60 in the XY coordinate system. As described above, the attention region S includes the first region S1 and the second region S2 in the XY coordinate system. The first region S1 is blocked by the stopped vehicle 60 when viewed from the own vehicle 50, that is, is located ahead of the stopped vehicle 60 when viewed from the own vehicle 50. The second region S2 is located to be adjacent to the closer side, i.e. the left side, of the stopped vehicle 60 to the own vehicle 50.

That is, the attention region S includes the first region S1 blocked by the stopped vehicle 60 when viewed from the own vehicle 50, that is, the first region S1 that it is difficult for the own vehicle 50 to recognize objects in.

Upon the attention region defining unit 45 defining the attention region S, the target object determiner 46 determines whether a target object is located in the attention region S. Specifically, upon determining that a fusion-based object is detected in the attention region S, the target object determiner 46 determines that the target object is located in the attention region S. In particular, the ECU 10 according to the exemplary embodiment is designed to assume recognition of a pedestrian 70 or a bicycle suddenly running from the attention region S in front of the own vehicle 50. For this reason, the target obtainer 46 can be configured to identify the type of the target object located in the attention region S in accordance with the result of the pattern matching described above, and determine that a pedestrian 70 is located in the attention region S as the target object.

For example, if a pedestrian 70 is located in the first region S1 of the attention region S, because the first region S1 is blocked by the stopped vehicle 60, the ECU 10 for example detects the pedestrian 70 in accordance with the first detection information obtained by the radar device 21 and the result of the pattern matching of the captured image with the upper-body feature patterns included in the dictionary file DF. This is because the lower-body of the pedestrian 70 is likely to be blocked by the stopped vehicle 60.

Upon determining that the target object is located in the attention region S, the detection history obtainer 47 obtains the detection history for the target object stored in the memory 10b before the determination that the target object is located in the attention region S. The recognition condition determiner 48 determines whether immediate recognition is required in accordance with the obtained detection history.

Specifically, the object recognizer 41 obtains, from the detection history file DHF, the cumulative detection number N prepared for the target object before the determination that the target object is located in the attention region S. As described above, the cumulative detection number N prepared for the target object is incremented by 1 each time the same target object is detected as any one of the radar-based object, the image-based object, and the fusion-based object. That is, if the target object is detected to be located in the attention region S for the first time, the cumulative detection number N prepared for the target object before the determination that the target object is located in the attention region S remains to be the initial value of zero.

After reading out the cumulative detection number N prepared for the target object from the detection history file DHF, the recognition condition determiner 48 determines whether the cumulative detection number N is less than a predetermined threshold number Th.

Upon determining that the cumulative detection number N is less than the predetermined threshold number Th, the recognition condition determiner 48 determines that the target object has not been captured before the determination that the target object is located in the attention region S. Then, the recognition condition determiner 48 relaxes the recognition condition for the attention region S in the condition relaxation mode to be lower than the recognition condition for the attention region S in the normal recognition mode.

Specifically, the recognition condition determiner 48 changes the threshold number of times A, i.e. three times, in the normal recognition mode to one time in the condition relaxation mode. That is, because the cumulative detection number N is lower than the threshold number N, the target object is estimated to suddenly appear in the attention region S, so that the recognition condition determiner 48 determines that the urgency of recognition for the target object is high.

In contrast, upon determining that the cumulative detection number N is equal to or more than the threshold number Th, the recognition condition determiner 48 determines that the target object has been already detected before the determination that the target object is located in the attention region S. Then, the recognition condition determiner 48 maintains the recognition condition for the attention region S unchanged, in other words, maintains the normal recognition mode unchanged.

Specifically, because the cumulative detection number N is equal to or higher than the threshold number N, the target object, such as the pedestrian 70 illustrated in FIG. 4, is estimated to have been already detected before entering the attention region S, so that the recognition condition determiner 48 determines that urgency of recognition for the target object is relatively low.

As described above, the ECU 10 according to the exemplary embodiment uses, as the requirement of changing the recognition condition for the attention region S, the cumulative detection number N prepared for a target object being less than the threshold number Th. In particular, the ECU 10 according to the exemplary embodiment uses the threshold number Th as a determination criterion to determine whether the target object has been captured before determination that the target object is located in the attention region S.

For example, the threshold setter 49 of the ECU 10 according to the exemplary embodiment variably sets the threshold number Th in accordance with the vehicle speed V of the own vehicle 50 measured by the vehicle speed sensor 23, the relative position of the target object relative to the own vehicle 50, and the relative position of the stopped vehicle 60 relative to the own vehicle 50.

Figure 5:
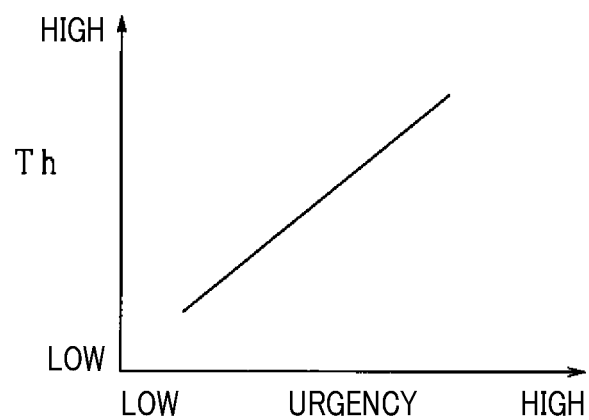
FIG. 5 is a graph schematically illustrating an example of the relationship between a threshold number and the urgency of target-object recognition.

FIG. 5 illustrates an example of the relationship between the threshold number Th and that urgency of recognition for the target object detected in the attention region S. FIG. 5 shows that the threshold number Th depends on the urgency of recognition for the target object detected in the attention region S. Specifically, the higher the threshold number Th is, the more the requirement of relaxing the recognition condition for the attention region S is likely to be satisfied, so that the threshold number Th is set to be higher as the urgency of recognition for the target object detected in the attention region S is higher. On the other hand, the lower the threshold number Th is, the less the requirement of relaxing the recognition condition for the attention region S is likely to be satisfied, so that the threshold number Th is set to be lower as the urgency of recognition for the target object detected in the attention region S is lower.

That is, the threshold setter 49 is configured to set a value of the threshold number Th in accordance with the vehicle speed V of the own vehicle 50 measured by the vehicle speed sensor 23, the relative position of the target object relative to the own vehicle 50, and the relative position of the stopped vehicle 60 relative to the own vehicle 50.

For example, the threshold setter 49 sets the threshold number Th to be higher as the relative distance between the own vehicle 50 and the stopped vehicle 60 or the target object becomes smaller, because the closer the stopped vehicle 60 or the target object is to the own vehicle 50, the higher the urgency of recognition for the target object becomes. In contrast, the threshold setter 49 sets the threshold number Th to be lower as the relative distance between the own vehicle 50 and the stopped vehicle 60 or the target object becomes larger, because the farther the stopped vehicle 60 or the target object is to the own vehicle 50, the lower the urgency of recognition for the target object becomes.

Similarly, the threshold setter 49 sets the threshold number Th to be higher as the vehicle speed V of the own vehicle 50 becomes higher, because the higher the vehicle speed V of the own vehicle 50 is, the higher the urgency of recognition for the target object becomes. In contrast, threshold setter 49 sets the threshold number Th to be lower as the vehicle speed V of the own vehicle 50 becomes lower, because the lower the vehicle speed V of the own vehicle 50 is, the lower the urgency of recognition for the target object becomes.

The threshold setter 49 can variably set the threshold number Th in accordance with at least one of the vehicle speed V of the own vehicle 50 measured by the vehicle speed sensor 23, the relative position of the target object relative to the own vehicle 50, and the relative position of the stopped vehicle 60 relative to the own vehicle 50. The threshold setter 49 can also variably set the threshold number Th in accordance with the compatible conditions determined based on the vehicle speed V of the own vehicle 50 measured by the vehicle speed sensor 23, the relative position of the target object relative to the own vehicle 50, and the relative position of the stopped vehicle 60 relative to the own vehicle 50.

The following describes the recognition condition adjustment task carried out by the ECU 50 in a predetermined condition adjustment period. As described above, the ECU 50 performs the object recognition task in the recognition period. That is, the ECU 50 is configured to perform the object recognition task for each recognition period using the object recognition condition determined at the corresponding recognition period. The recognition period and the condition adjustment period can be set to be identical to or different from each other.

Figure 6:
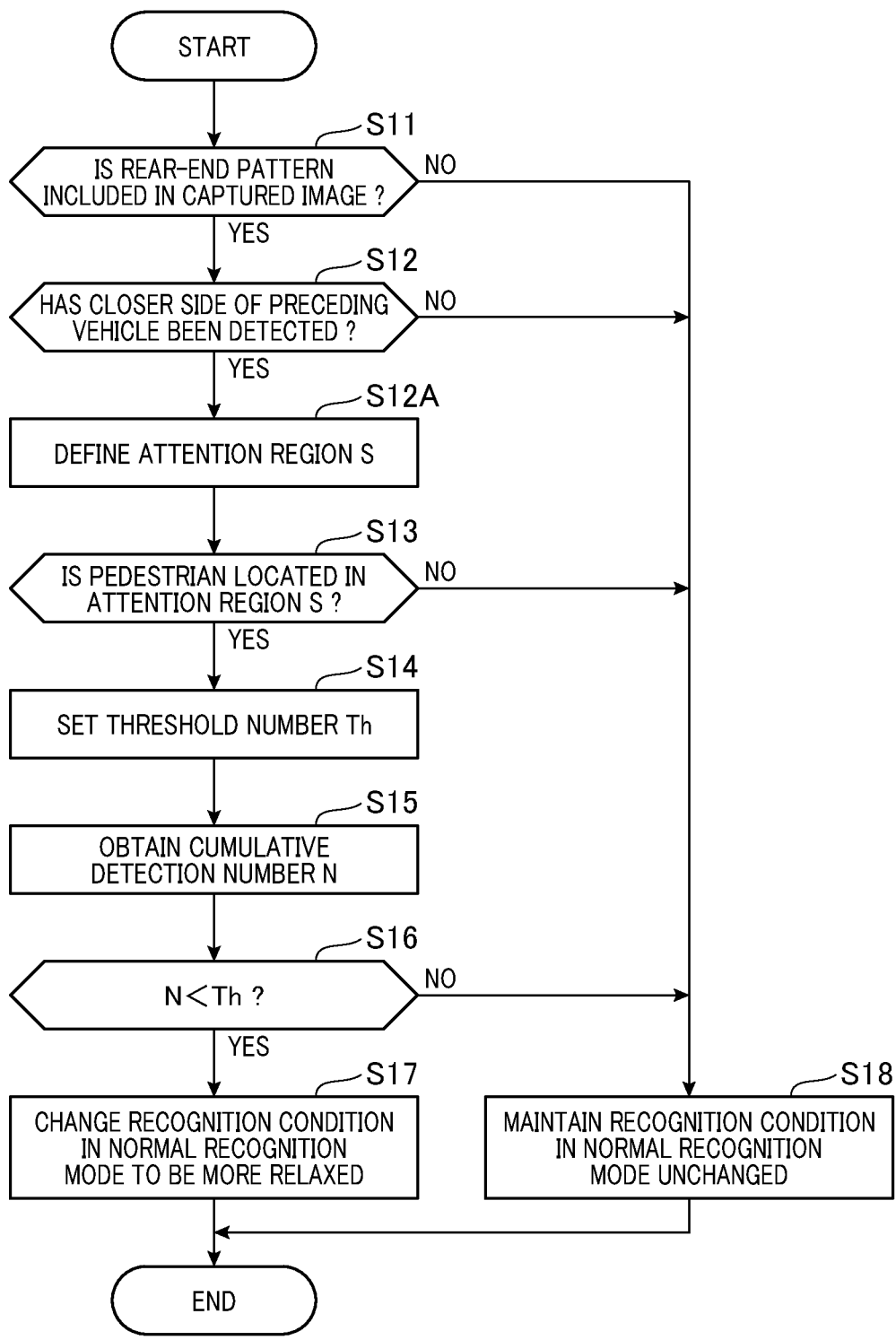
FIG. 6 is a flowchart schematically illustrating an example of a condition adjustment task carried out by an electronic control unit (ECU) illustrated in FIG. 1.

Upon executing the condition adjustment task, the ECU 10 serves as, for example, the attention region defining unit 45, to determine whether there is a stopped vehicle 60 as a blocking obstacle located ahead in the travelling direction of the own vehicle 50 in the combination of steps S11 and S12 of FIG. 6.

Specifically, the ECU 50 determines whether one of the rear-end feature patterns Q included in the dictionary files DF is detected in the captured image based on the result of pattern matching of the rear-end feature patterns with the captured image in step S11.

Upon determining that one of the rear-end feature patterns Q is detected in the captured image (YES in step S11), the ECU 50 determines that a preceding vehicle is located ahead in the travelling direction of the own vehicle 50. Then, the ECU 50 determines whether a closer side of the preceding vehicle detected in step S11 has been detected while the location of the side is unchanged in step S12.

Specifically, upon obtaining plural detection points P, i.e. radar reflection points P, of the preceding vehicle located in parallel to the travelling direction of the own vehicle 50 while the location of the set of the plural detection points P is unchanged (YES in step S12), the ECU 50 determines that the closer side of the preceding vehicle has been detected while the location of the preceding vehicle is unchanged.

This results in the ECU 50 determining that the stopped vehicle 60 being located ahead in the travelling direction of the own vehicle 50. In step S12, the ECU 10 can detect the stopped vehicle 60 based on the relative speed between the own vehicle 50 and the stopped vehicle 60. Then, the recognition condition adjustment task proceeds to step S12A.

Otherwise, upon determining that at least one of the determination in step S11 and the determination in step S12 is negative (NO in step S11 or in step S12), the ECU 10 determines that there are no stopped vehicles 60, i.e. no blocking obstacles, located ahead in the travelling direction of the own vehicle 50. Then, the recognition condition adjustment task proceeds to step S18.

In step S18, the ECU 10 serves as, for example, the recognition condition determiner 48, to maintain the recognition condition unchanged, i.e. maintains the recognition condition in the normal recognition mode.

In step S12A, the ECU 10 serves as, for example, attention region defining unit 45, to define the attention region S (see FIG. 3) around the stopped vehicle 60 in the XY coordinate system.

Next, in step S13, the ECU 10 serves as, for example, the target object determiner 46, to determine whether a pedestrian 70 for example selected as a target object is located in the attention region S. Specifically, the ECU 10 determines whether a pedestrian 70, which is a fusion-based object, is located in the attention region S in step S13. Upon determining that a pedestrian 70 is located in the attention region S (YES in step S13), the recognition condition adjustment task proceeds to step S14. Otherwise, upon determining that no pedestrians are located in the attention region S (NO in step S13), the recognition condition adjustment task proceeds to step S18. In step S18, the ECU 10 serves as, for example, recognition condition determiner 48, to maintain the recognition condition unchanged, i.e. maintains the recognition condition in the normal recognition mode.

In step S14, the ECU 10 serves as, for example, the threshold setter 49, to set a value of the threshold number Th in accordance with the vehicle speed V of the own vehicle 50 measured by the vehicle speed sensor 23, the relative position of the target object relative to the own vehicle 50, and the relative position of the stopped vehicle 60 relative to the own vehicle 50.

Next, in step S15, the ECU 10 serves as, for example, the detection history obtainer 47, to obtain the detection history for the pedestrian 70, who has been detected in step S13, stored in the memory 10b before the determination that the target object is located in the attention region S. Specifically, in step S15, the ECU 10 obtains, from the detection history file DHF, the cumulative detection number N prepared for the pedestrian 70 before the determination that the pedestrian 70 is located in the attention region S.

Next, in step S16, the ECU 10 serves as, for example, the recognition condition determiner 48, to determine whether the cumulative detection number N prepared for the pedestrian 70 is less than the threshold number Th set in step S14.

Upon determining that the cumulative detection number N prepared for the pedestrian 70 is less than the threshold number Th (YES in step S16), the recognition condition adjustment task proceeds to step S17. Otherwise, upon determining that the cumulative detection number N prepared for the pedestrian 70 is equal to or more than the threshold number Th (NO in step S16), the recognition condition adjustment task proceeds to step S18. In step S18, the ECU 10 serves as, for example, recognition condition determiner 48, to maintain the recognition condition unchanged, i.e. maintains the recognition condition in the normal recognition mode.

In step S17, the ECU 10 serves as, for example, the recognition condition determiner 48, to change the recognition condition for the attention area S to be more relaxed in the condition relaxation mode than the recognition condition in the normal recognition mode. Specifically, in step S17, the ECU 10 changes the threshold number times of A in the normal recognition mode to a lower value as the value of the threshold number of times A in the recognition relaxation mode.

After the operation in step S17 or S18, the ECU 10 terminates the condition adjustment task.

As described in detail above, the exemplary embodiment obtains the following advantageous effects.

If there is a blocking obstacle located between the own vehicle 50 and an object, and the blocking obstacle blocks the view from the own vehicle 50, it may be difficult for the ECU 10 to recognize the object. For example, let us assume a situation where there is a stopped vehicle 60 as a blocking obstacle between the own vehicle 50 and a pedestrian 70 as an object to be recognized. That is, in this situation, it is desirable for the PCS system 100 to activate the safety devices 31 to 33 depending on the urgency of recognition for the pedestrian 70.

From this viewpoint, the ECU 10 of the PCS system 100 according to the exemplary embodiment is configured to determine whether the pedestrian 70 is located in the attention region S defined around the stopped vehicle 60. Upon determining that the pedestrian 70 is located in the attention region S, the ECU 10 is configured to obtain the detection history of the pedestrian 70 before determining that the pedestrian 70 is located in the attention region S. Then, the ECU 10 is configured to adjust the procedure for recognizing the pedestrian 70 as a function of the obtained detection history.

Specifically, the ECU 10 determines, based on the detection history of the pedestrian 70, whether the pedestrian 70 has been captured before determining that the pedestrian 70 is located in the attention region S.

Upon determining that the pedestrian 70 has not been captured before determining that the pedestrian 70 is located in the attention region S, the urgency of recognition for the pedestrian 70 is high, so that it is necessary to cause the urgency of recognition for the pedestrian 70 to have a higher priority than the reliability of recognition for the pedestrian 70.

Otherwise, upon determining that the pedestrian 70 has been captured before determining that the pedestrian 70 is located in the attention region S, the urgency of recognition for the pedestrian 70 is relatively low, so that it is necessary to cause the reliability of recognition for the pedestrian 70 to have a higher priority than the urgency of recognition for the pedestrian 70.

For this reason, the above configuration of the PCS system 100 makes it possible to perform the object recognition task for the pedestrian 70 while factoring in the urgency of recognition for the pedestrian 70. This enables the safety devices 31 to 33 to be suitably activated to satisfy both the urgency and the reliability of recognition for the pedestrian 70 even if the pedestrian 70 is located in the attention region S.

Specifically, the ECU 10 determines, based on the detection history of the pedestrian 70, whether the pedestrian 70 has been captured before determining that the pedestrian 70 is located in the attention region S.

Upon determining that the pedestrian 70 has not been captured before determining that the pedestrian 70 is located in the attention region S, the ECU 10 is configured to change a level of the recognition condition in the normal recognition mode such that the changed level of the recognition condition in the condition relaxation mode is lower than the level of the recognition condition in the normal recognition mode. Otherwise, upon determining that the pedestrian 70 has been captured before determining that the pedestrian 70 is located in the attention region S, the ECU 10 is configured to maintain the recognition condition in the normal recognition mode unchanged.

That is, when it is determined that the pedestrian 70 has not been captured before determining that the pedestrian 70 is located in the attention region S, the target object is estimated to suddenly appear in the attention region S, so that the recognition condition determiner 48 determines that the urgency of recognition for the target object is high. In this case, the ECU 10 changes the level of the recognition condition in the normal recognition mode such that the changed level of the recognition condition in the condition relaxation mode is lower then the level of the recognition condition in the normal recognition mode, thus enabling the urgency of recognition for the pedestrian 70 to have a higher priority than the reliability of recognition for the pedestrian 70.

In contrast, when it is determined that the pedestrian 70 has been captured before determining that the pedestrian 70 is located in the attention region S, because the pedestrian 70 has been already detected before the determination that the target object is located in the attention region S, the urgency of recognition for the pedestrian 70 is relatively low. For this reason, the ECU 10 maintains the recognition condition in the normal recognition mode unchanged, thus enabling the reliability of recognition for the pedestrian 70 to have a higher priority than the urgency of recognition for the pedestrian 70.

That is, the above configured ECU 10 enables the object recognition task for the pedestrian 70 to be performed while factoring in the urgency of recognition for the pedestrian 70.

In particular, as determination of whether the pedestrian 70 has been captured before determining that the pedestrian 70 is located in the attention region S, the ECU 10 is configured to determine whether the cumulative detection number N for the pedestrian 70 before determining that the pedestrian 70 is located in the attention region S is lower the threshold number Th.

Upon determining that the cumulative detection number N for the pedestrian 70 before determining that the pedestrian 70 is located in the attention region S is lower than the threshold number Th, the ECU 10 is configured to determine that the pedestrian 70 has not been captured before determining that the pedestrian 70 is located in the attention region S. Otherwise, upon determining that the cumulative detection number N for the pedestrian 70 before determining that the pedestrian 70 is located in the attention region S is equal to or higher than the threshold number Th, the ECU 10 is configured to determine that the pedestrian 70 has been captured before determining that the pedestrian 70 is located in the attention region S.

This configuration of the ECU 10 enables the detection history of the pedestrian 70 before determining that the pedestrian 70 is located in the attention region S to be obtained with higher accuracy.

Change of the threshold number Th enables the urgency of recognition for the pedestrian 70 to be changed; the urgency of recognition for the pedestrian 70 changes depending on the vehicle speed V of the own vehicle 50, the relative position of the target object relative to the own vehicle 50, and the relative position of the stopped vehicle 60 relative to the own vehicle 50.

From this viewpoint, the ECU 10 is configured to set the threshold number Th in accordance with the vehicle speed V of the own vehicle 50 measured by the vehicle speed sensor 23, the relative position of the target object relative to the own vehicle 50, and the relative position of the stopped vehicle 60 relative to the own vehicle 50. This configuration enables a value of the threshold number Th to be determined to be suitable for the current degree of urgency of recognition for the pedestrian 70, thus making it possible to activate the safety devices 31 to 33 to be suitable for the current degree of urgency of recognition for the pedestrian 70.

Modifications

Upon determining that the pedestrian 70 is located in the attention region S, the ECU 10 according to the exemplary embodiment is configured to obtain, from the memory 10b, the cumulative detection number N for the pedestrian 70 before determining that the pedestrian 70 is located in the attention region S. The present disclosure is however not limited to this configuration.

Figure 7:
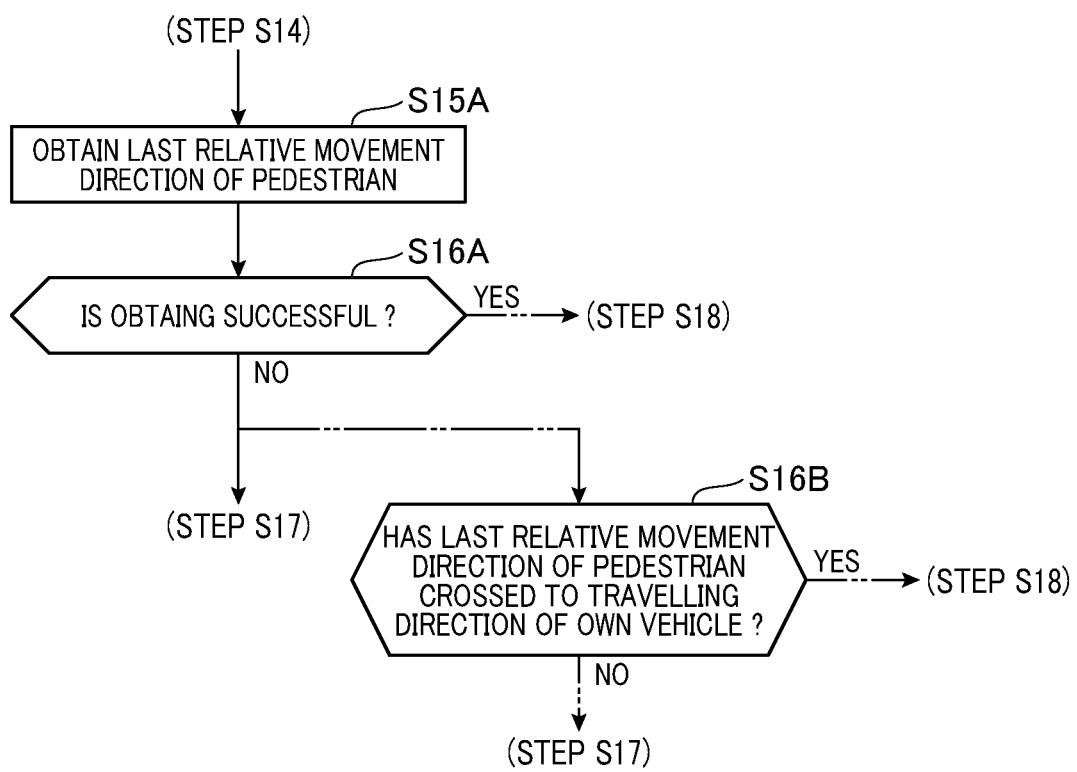
FIG. 7 is a flowchart schematically illustrating first and second modifications of the exemplary embodiment.

Specifically, in step S15A of FIG. 7 according to a first modification of the exemplary embodiment, the ECU 10 can be configured to obtain, as the detection history of the pedestrian 70, a last relative movement direction of the pedestrian 70 relative to the own vehicle 50 before determining that the pedestrian 70 is located in the attention region S. For example, in step S15A, the ECU 10 can extract, among captured plural frame images including a currently captured frame image, predetermined feature points in the pedestrian 70. Then, in step S15A, the ECU 10 can obtain optical flow vectors of the extracted feature points; each of the optical flow vectors of a feature point represents an apparent movement of the feature point among the plural frame images. In step S15A, the ECU 10 can obtain, based on the optical flow vectors, the inclination of the last movement direction of the pedestrian 70 to the travelling direction of the own vehicle 50 as the last relative movement direction of the pedestrian 70 relative to the own vehicle 50.

Following the operation in step S15A, the ECU 10 can determine whether the obtaining of the last relative movement direction of the pedestrian 70 relative to the own vehicle 50 has been successfully completed in step S16A.

Upon determining that the obtaining of the last relative movement direction of the pedestrian 70 relative to the own vehicle 50 has not been successfully completed (NO in step S16A), the ECU 10 can determine that the pedestrian 70 has not been captured before determining that the pedestrian 70 is located in the attention region S. That is, the ECU 10 can determine that urgency of recognition for the pedestrian 70 is high, changing the recognition condition in the normal recognition mode to be more relaxed (see step S17).

Otherwise, upon determining that the obtaining of the last relative movement direction of the pedestrian 70 relative to the own vehicle 50 has been successfully completed (YES in step S16A), the ECU 10 can determine that the pedestrian 70 has been captured before determining that the pedestrian 70 is located in the attention region S. That is, the ECU 10 can determine that urgency of recognition for the pedestrian 70 is relatively low, maintaining the recognition condition in the normal recognition mode unchanged (see step S18).

In particular, upon determining that the obtaining of the last relative movement direction of the pedestrian 70 relative to the own vehicle 50 has been successfully completed (YES in step S16A), the ECU 10 can be configured to determine whether urgency of recognition for the pedestrian 70 is required in accordance with the last relative movement direction of the pedestrian 70 relative to the own vehicle 50 according to a second modification of the exemplary embodiment.

Specifically, the ECU 10 according to the second modification can be configured to further determine whether the last relative movement direction of the pedestrian 70 relative to the own vehicle 50 has crossed the travelling direction of the own vehicle 50 in step S16B.

Upon determining that the last relative movement direction of the pedestrian 70 relative to the own vehicle 50 has substantially crossed the travelling direction of the own vehicle 50 (YES in step S16B), the ECU 10 can be configured to determine that urgency of recognition for the pedestrian 70 is relatively low, maintaining the recognition condition in the normal recognition mode unchanged (see step S18).

Otherwise, upon determining that the last relative movement direction of the pedestrian 70 relative to the own vehicle 50 has been substantially parallel to the travelling direction of the own vehicle 50 (NO in step S16B), the ECU 10 can be configured to determine that urgency of recognition for the pedestrian 70 is high, changing the recognition condition in the normal recognition mode to be more relaxed (see step S17).

This configuration according to the second modification enables urgency of recognition for the pedestrian 70 to be determined in accordance with both 1. Whether the pedestrian 70 has been captured before it is determined that the pedestrian 70 is located in the attention region S 2. Whether the last relative movement direction of the pedestrian 70 relative to the own vehicle 50 was across the travelling direction of the own vehicle 50

This enables more reliable collision mitigation and/or avoidance operation to be carried out for the pedestrian 70.

The ECU 10 according to the exemplary embodiment is configured to change the threshold number of times A in the normal recognition mode to a lower value as the value of the threshold number of times A in the recognition relaxation mode, thus relaxing the recognition condition for the attention region S, but the present disclosure is not limited to this configuration.

For example, the ECU 10 can be configured to

1. Receive the relative positions of plural fusion-based objects for each of the recognition periods 2. Increment a same-object count value whose initial value is zero each time the relative position of a first fusion-based object in the plural fusion-based object and the relative position of a second fusion-based object in the plural fusion-based object satisfy a predetermined condition in one of the recognition periods 3. Determine that the first fusion-based object and the second fusion-based object are the same fusion-based object upon the same-object count value having reached the threshold number of times A 4. Relax the predetermined condition upon determining that the target object has not been captured before determination that the target object is located in the attention region S This modification can be used for the radar-based objects or image-based objects in place of the fusion-based objects.

The ECU 10 is configured to detect a stopped vehicle 60 as an example of a blocking obstacle located ahead in front of the own vehicle 50, but can be configured to detect an on-road obstacle, such as a power or telephone pole or a guardrail. In this modification, the ECU 10 can be configured to detect an on-road obstacle based on the result of the pattern matching of the captured image stored in the memory 10b with the feature patterns of the on-road obstacles included in the dictionary files DF. Then, the ECU 10 can be configured to define an attention region S around the detected on-road obstacle.

The ECU 10 is configured to determine whether a pedestrian 70 is located in the attention region S as a target object to be recognized, but can be configured to determine whether another type of target object to be recognized is located in the attention region S, such as a bicycle.

While the illustrative embodiment and its modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus to be installed in an own vehicle equipped with an object detection sensor that repeatedly performs a detection operation for detecting objects around the own vehicle, the apparatus being configured to recognize, based on results of the detection operations, a target object upon at least part of results of the detection operations associated with the target object satisfying a recognition condition that is predetermined, and perform at least one of a collision avoidance operation and a damage mitigation operation for the own vehicle with respect to the recognized target object, the apparatus comprising:
    an attention region defining unit configured to define an attention region near a blocking obstacle in response to the blocking obstacle being determined to be located between the own vehicle and the target object based on the results of the detection operations;
    a determiner configured to determine whether the target object is located in the attention region;
    an obtaining unit configured to obtain, in response to the target object being determined to be is located in the attention region, a detection history of the target object by the object detection sensor before the target object is determined to be located in the attention region;
    a detection determiner configured to determine, based on the obtained detection history, whether the target object has been captured before the target object is determined to be located in the attention region; and
    an adjuster configured to relax the recognition condition in response to the target object being determined to have not been captured before the target object is determined to be located in the attention region.

2. The apparatus according to claim 1, wherein the adjuster is configured to maintain the recognition condition unchanged upon it being determined that the target object has been captured before the target object is determined to be located in the attention region.

3. The apparatus according to claim 1, wherein:
the detection determiner is configured to:
    determine, based on the obtained detection history, whether a number of detections of the target object before the target object is determined to be located in the attention region is less than a threshold number;
    determine that the target object has not been captured before the target object is determined to be located in the attention region upon it being determined that the number of detections of the target object before the target object is determined to be located in the attention region is less than the threshold number; and
    determine that the target object has been captured before the target object is determined to be located in the attention region upon it being determined that the number of detections of the target object before the target object is determined to be located in the attention region is equal to or more than the threshold number.

4. The apparatus according to claim 3, further comprising:
a threshold setter configured to set the threshold number as a function of a speed of the own vehicle.

5. The apparatus according to claim 3, further comprising:
a threshold setter configured to set the threshold number as a function of a relative position of the target object relative to the own vehicle.

6. The apparatus according to claim 3, further comprising:
a threshold setter configured to set the threshold number as a function of a relative position of the target object relative to the own vehicle.

7. A method applied to an apparatus to be installed in an own vehicle equipped with an object detection sensor that repeatedly performs a detection operation for detecting objects around the own vehicle, the method recognizing, based on results of the detection operations, a target object upon at least part of results of the detection operations associated with the target object satisfying a recognition condition that is predetermined, and perform at least one of a collision avoidance operation and a damage mitigation operation for the own vehicle with respect to the recognized target object, the method comprising:
    defining an attention region near a blocking obstacle in response to the blocking obstacle being determined to be located between the own vehicle and the target object based on the results of the detection operations;
    determining whether the target object is located in the attention region;
    obtaining, in response to the target object being determined to be located in the attention region, a detection history of the target object by the object detection sensor before the target object is determined to be located in the attention region;
    determining, based on the obtained detection history, whether the target object has been captured before the target object is determined to be located in the attention region; and
    relaxing the recognition condition in response to the target object being determined to have not been captured before the target object is determined to be located in the attention region.

8. The method according to claim 7,
the method further comprising:
maintaining the recognition condition unchanged upon it being determined that the target object has been captured before the target object is determined to be located in the attention region.

9. The method according to claim 7, wherein:
the step of determining whether the target object has been captured further comprises:

determining, based on the obtained detection history, whether a number of detections of the target object before the target object is determined to be located in the attention region is less than a threshold number;

determining that the target object has not been captured before the target object is determined to be located in the attention region upon it being determined that the number of detections of the target object before the target object is determined to be located in the attention region is less than the threshold number; and determining that the target object has been captured before the target object is determined to be located in the attention region upon it being determined that the number of detections of the target object before the target object is determined to be located in the attention region is equal to or more than the threshold number.

10. The method according to claim 9, further comprising: setting the threshold number as a function of a speed of the own vehicle.

11. The method according to claim 9, further comprising: setting the threshold number as a function of a relative position of the target object relative to the own vehicle.

12. The method according to claim 9, further comprising: setting the threshold number as a function of a relative position of the blocking obstacle relative to the own vehicle.

* * * * *